United States Patent
Karatzoglou et al.

(10) Patent No.: US 11,074,361 B2
(45) Date of Patent: Jul. 27, 2021

(54) SERVER APPLICATION AND METHOD FOR CHECKING THE PLAUSIBILITY OF PRIVACY STATEMENTS

(71) Applicant: Robert Bosch GmbH, Stuttgart (DE)

(72) Inventors: Antonios Karatzoglou, Stuttgart (DE); Jan Zibuschka, Magstadt (DE)

(73) Assignee: Robert Bosch GmbH, Stuttgart (DE)

( * ) Notice: Subject to any disclaimer, the term of this patent is extended or adjusted under 35 U.S.C. 154(b) by 324 days.

(21) Appl. No.: 16/156,311

(22) Filed: Oct. 10, 2018

(65) Prior Publication Data
US 2019/0114443 A1 Apr. 18, 2019

(30) Foreign Application Priority Data
Oct. 18, 2017 (DE) .......................... 102017218547.3

(51) Int. Cl.
*G06F 7/04* (2006.01)
*G06F 21/62* (2013.01)
*H04L 29/06* (2006.01)
*G06F 16/907* (2019.01)
*G06Q 30/02* (2012.01)

(52) U.S. Cl.
CPC ........ *G06F 21/6245* (2013.01); *G06F 16/907* (2019.01); *G06Q 30/0207* (2013.01); *H04L 63/10* (2013.01); *H04L 63/102* (2013.01); *H04L 63/1441* (2013.01); *H04L 63/20* (2013.01)

(58) Field of Classification Search
CPC .............. G06F 21/6245; G06F 16/907; G06F 17/30997; H04L 63/102; H04L 63/1441; H04L 63/10; H04L 63/20; G06Q 30/0207
USPC ............................................................ 726/26
See application file for complete search history.

(56) References Cited

U.S. PATENT DOCUMENTS

| | | | | |
|---|---|---|---|---|
| 10,891,393 | B2* | 1/2021 | Currier | G06F 21/577 |
| 2002/0049617 | A1* | 4/2002 | Lencki | G06Q 40/08 |
| | | | | 705/4 |
| 2005/0091101 | A1* | 4/2005 | Epling | G06Q 30/06 |
| | | | | 705/325 |
| 2005/0210285 | A1* | 9/2005 | Williams | G06F 16/9535 |
| | | | | 726/5 |
| 2006/0184995 | A1* | 8/2006 | Backes | G06Q 10/06 |
| | | | | 726/1 |
| 2009/0300716 | A1* | 12/2009 | Ahn | H04L 63/0807 |
| | | | | 726/1 |
| 2010/0153695 | A1* | 6/2010 | Bussard | G06F 21/6245 |
| | | | | 713/1 |
| 2011/0145920 | A1* | 6/2011 | Mahaffey | G06F 21/564 |
| | | | | 726/22 |

(Continued)

OTHER PUBLICATIONS

Microsoft, "Windows 7 Privacy Statement", Feb. 2011, 45 pages.*

*Primary Examiner* — Samson B Lemma
(74) *Attorney, Agent, or Firm* — Norton Rose Fulbright Us LLP; Gerard Messina

(57) ABSTRACT

A server application, in particular an electronic marketplace for access by a user to information, data, and/or services that are provided by at least one provider as an offering in the server application. The server application is configured for checking the plausibility of the privacy statements based on a comparison of privacy statements for the information, the data, and/or the service to data protection-relevant metainformation of the associated offering.

9 Claims, 3 Drawing Sheets

(56) References Cited

U.S. PATENT DOCUMENTS

| | | | |
|---|---|---|---|
| 2011/0282678 A1* | 11/2011 | Chapman | G06Q 30/06 |
| | | | 705/1.1 |
| 2014/0119540 A1* | 5/2014 | Pearson | H04L 9/0825 |
| | | | 380/44 |
| 2014/0344948 A1* | 11/2014 | Hayato | G06F 21/6218 |
| | | | 726/26 |
| 2015/0207819 A1* | 7/2015 | Sartor | H04L 63/20 |
| | | | 726/1 |
| 2016/0099963 A1* | 4/2016 | Mahaffey | G06F 21/554 |
| | | | 726/25 |
| 2016/0112456 A1* | 4/2016 | Pearson | H04L 63/0876 |
| | | | 713/170 |
| 2016/0134649 A1* | 5/2016 | Allen | H04L 63/1483 |
| | | | 726/23 |

\* cited by examiner

SERVER APPLICATION AND METHOD FOR CHECKING THE PLAUSIBILITY OF PRIVACY STATEMENTS

CROSS REFERENCE

The present application claims the benefit under 35 U.S.C. § 119 of German Patent Application No. DE 102017218547.3 filed on Oct. 18, 2017, which is expressly incorporated herein by reference in its entirety.

FIELD

The present invention relates to a server application, in particular an electronic marketplace for access to information, data, and/or services, that is configured for checking the plausibility of privacy statements. Moreover, the present invention relates to a method for checking the plausibility of privacy statements for the information, data, and/or services. Furthermore, the present invention relates to a computer program that carries out each step of the method when the method runs on a computer, and a non-transitory machine-readable memory medium that stores the computer program.

BACKGROUND INFORMATION

Information, data, and/or services are offered on an electronic marketplace. The information, data, and/or services are provided by at least one provider as an offering on the electronic marketplace. A user or the user's service registers on the electronic marketplace, via which they may then find a suitable provider for their needed information, data, and/or services. A typical user is a developer of an application, who develops the application from the information, data, and/or services. Optionally, a payment may also be processed via the electronic marketplace. In order for the application to be ultimately passed on to the end user, he/she needs data protection characteristics concerning the used information, data, and/or services. The end user obtains these primarily from the privacy statements that are provided by the provider. However, these privacy statements may be erroneous. Erroneous privacy statements may, for example, also be the result of a service accessing other information, data, and/or services and disregarding their privacy statements. Regardless of whether the privacy statements are erroneous due to intentional or unintentional actions, independent plausibility checking of the privacy statements is advantageous.

SUMMARY

A server application for access to information, data, and/or services by a user is provided. The server application may be provided on a server which at least the user and a provider may access, for example with the aid of a communication network. The server application is in particular an electronic marketplace on which the information, data, and/or or services are offered, traded, exchanged, and/or sold. The information, data, and/or services are provided by at least one provider as an offering in the server application. For example, information from sensors, or processed data or services that process and/or transform the information, are offered in the server application. The provider indicates privacy statements concerning the information, data, and/or services or for the associated offering. The user is, for example, a developer of an application. The user may obtain the needed information, data, and/or services from the provider directly via the server application, and on this basis may develop his/her application. To learn data protection characteristics concerning the obtained information, data, and/or services, the developer may access at least the privacy statements of the provider. The data protection characteristics are relevant in particular when the developer ultimately passes on this application to the end user. The application itself and/or some other service that accesses the information, the data, and/or the service on the server application may also be regarded as users. In addition, an end customer him/herself may be a user.

The offering is a formalized description of the information, the data, and/or the service in a standardized format. The offering may be regarded as a model for the information, the data, and/or the service with regard to the following aspects; not all of the following aspects have to be contained in the offering, and other aspects may be additionally incorporated:
 information, data, and/or services are offered;
 the source of the data;
 the quality of the data; and
 the format in which the data are offered.

Altogether, the offering provides comprehensive information concerning the offered information, data, and/or services, in particular technical information and other characteristics.

The offering includes metainformation, i.e., information related to the offering, such as:
 the address;
 authentication mechanisms; and
 which data are provided.

Also included are data protection-relevant pieces of metainformation that provide information concerning data protection characteristics of the offered information, data, and/or services, such as:
 which data are collected;
 for what purpose are the data collected;
 are more data collected than necessary;
 are the data passed on; and
 are the data resold.

The server application is configured for checking the plausibility of the privacy statements based on a comparison of the privacy statements for the information, the data, and/or the service provided by the provider to the data protection-relevant metainformation of the associated offering. In other words, a comparison is made of what is asserted in the privacy statements, which data are needed for a service, for example, and how they are used, to which data are actually needed for the service and how they are actually used, the latter being learned from the data protection-relevant metainformation of the associated offering. If the privacy statements match the metainformation, the privacy statements are checked for plausibility and therefore regarded as correct.

The metainformation is preferably stored in annotations. According to one aspect, the annotations may be stored in the server application as part of the offering. According to another aspect, the annotations may be directly stored and retrieved in the server application for the provided service. According to yet another aspect, the annotations may be transmitted together with data that are transferred in the communication network, for example from the provider to the user, with the aid of the server application. These aspects all offer the advantage that the metainformation is accessible and may be easily retrieved.

The data protection characteristics may be output as a display signal and displayed to the user. For displaying the display signal, any display element that is linked to the communication network, but preferably a combined input and display device such as a PC or a mobile terminal, may be used. Privacy icons, which are a type of display in the form of symbols (icons), are particularly suited for depicting the data protection characteristics. The privacy icons may be emphasized in different colors and/or shapes in order to evaluate the data protection characteristics. Privacy icons may on the one hand be applied to the offering in the server application in order to directly inform a user about the data protection characteristics. On the other hand, the privacy icons may be used in an application that accesses the information, data, and/or services provided in the server application in order to display to an end user of this application the data protection characteristics, in particular also the information, data, and/or services, i.e., the data sources, that are reverted to.

The privacy icons include in particular the following data protection aspects:
 minimum necessary data;
 how long are data stored;
 are data processed only for the purpose for which they have been collected;
 are no personal data passed on;
 are no personal data resold;
 encryption;
 previous services and/or data sources that were considered are likewise checked and taken into account.

Moreover, a method for checking the plausibility of the privacy statements for the information, data, and/or services that are provided by at least one provider as an offering in the server application is provided. The method includes the following steps: At the start, the privacy statements for the information, data, and/or services are collected. The privacy statements are usually indicated by the provider. In addition, the data protection-relevant metainformation of the offering is determined. For this purpose, additional metainformation of all providers that provide the information, the data, and/or the service is preferably included when determining the data protection-relevant metainformation.

The privacy statements for the information, the data, and/or the service provided by the provider are compared to the associated metainformation of the offering. In other words, what is asserted in the privacy statements, which data are needed for a service, for example, and how these data are used are compared to which data are actually needed for the service and how the data are actually used, the latter being learned from the data protection-relevant metainformation of the associated offering. It may be determined, among other things, whether data are further transmitted, whether payment is made for the further transmission, and/or whether a service collects unnecessary data; for this purpose, the information that is reasonable and necessary for the intended uses may be determined with the aid of a database.

If the privacy statements match the metainformation, the privacy statements are plausibility-checked and therefore regarded as correct.

However, if the privacy statements differ from the metainformation, one or more of the following countermeasures (or others) may be taken by the server application:
 The metainformation of the offering may be adapted.
 The privacy statements may be adapted.
 Access to the information, data, and/or services that have not been plausibility-checked may be blocked, as the result of which they are no longer available to users.
 A warning signal may be output and displayed to the users, preferably when they attempt to access the information, data, and/or services not checked for plausibility.

The stated countermeasures may be selected based on selection criteria. Several selection criteria are listed below as an example; not all of the stated selection criteria have to be checked, and on the other hand, further selection criteria may be added:
 Will an additional test (audit) of the information, data, and/or services with regard to further standards (not described in greater detail here) be carried out?
 Is there other data protection information that has not previously been used in this method and that may be reverted to?
 Who are the providers of the information, data, and/or services in question, and how are they configured? Are the providers certified or otherwise particularly trustworthy?
 Is there an option to display the warning signal to the user, for example via a user terminal and/or an interface?

As described above, the metainformation may preferably be stored in annotations, and according to one aspect the annotations may be stored in the server application as part of the offering, and according to another aspect may be stored in the server application for the provided service, and according to yet another aspect may be transferred with data that are transmitted via the communication network, with the aid of the server application.

Other metainformation from previous information, data, and/or services reverted to by the current information, data, and/or services may advantageously be taken into account in the comparison. This sequence may be continued recursively until all information, data, and/or services reverted to in this sequence are taken into account. In this way, data protection characteristics of the previous information, data, and/or services are also checked. As an example case, it is to be assumed that an offered first service reverts to a second service that does not encrypt the data that it uses. The provider indicates in the privacy statements of the first service that the data are encrypted. Even if the first service encrypts the data, the privacy statements are not checked for plausibility, since the data have not been thoroughly encrypted.

The computer program is configured for carrying out each step of the method, in particular when it is executed on a computer. For implementation, the computer program is stored on the machine-readable memory medium.

BRIEF DESCRIPTION OF THE DRAWINGS

Specific embodiments of the present invention are illustrated in the figures and explained in greater detail below.

DETAILED DESCRIPTION OF EXAMPLE EMBODIMENTS

Figure 1:
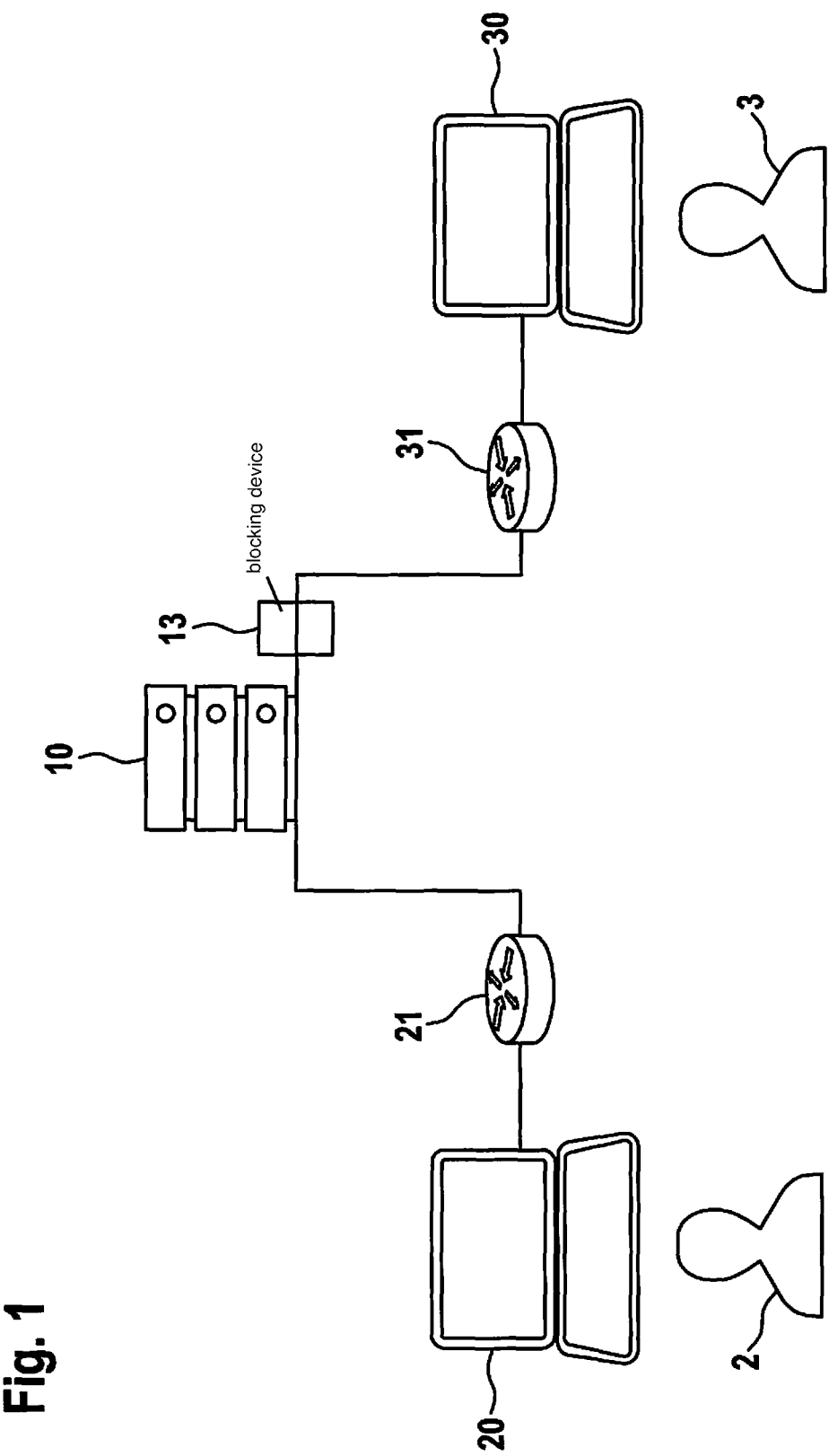
FIG. 1 shows a communication network between a server on which one specific embodiment of the present invention is provided, a provider, and a user.

FIG. 1 shows a communication network between a server 10 on which one specific embodiment of the server application according to the present invention is provided, a provider 2, and a user 3. Provider 2 uses a provider terminal 20 that is in contact with server 10 via a provider router 21 in order to access the communication network and to interact with server 10. Provider 2 may at least make inputs to server 10 with the aid of provider terminal 20. Similarly, user 3 uses a user terminal 30 that is in contact with server 10 via a user router 31 in order to access the communication network and to interact with server 10. User 3 may at least make inputs to server 10 via user terminal 30 and display signals that are emitted by server 10. In particular, a warning signal may also be displayed to user 3. Provider terminal 20 and user terminal 30 are input devices and optionally display devices such as a PC or a mobile terminal. In another exemplary embodiment, provider 2 and user 3 may additionally be directly connected to one another within the communication network via their routers 21, 31. In addition, a blocking device 13 is provided which partially or completely prevents access by user 3 to information, data, and/or services of server 10. Blocking device 13 may also be part of server 10.

Figure 2:
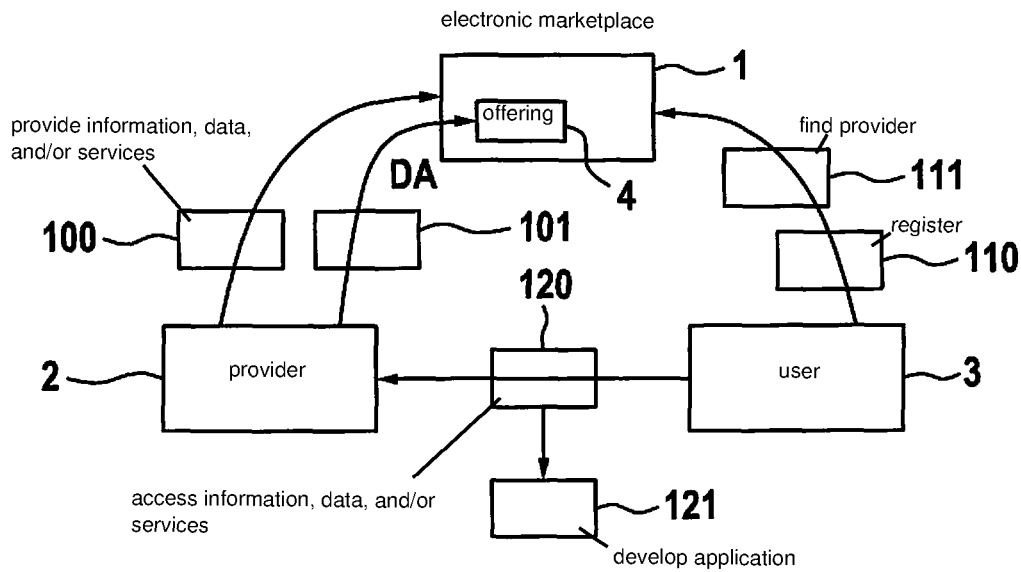
FIG. 2 shows a diagram of a system architecture of the communication network from FIG. 1, and a flow chart for access to information, data, and/or services according to one specific embodiment of the present invention.

FIG. 2 illustrates a diagram of a system architecture of the communication network from FIG. 1. The server application according to the present invention is provided on server 10 in the form of an electronic marketplace 1. In addition, FIG. 2 shows a flow chart for access to information, data, and/or services by user 3. Provider 2 provides 100 information, data, and/or services as an offering 4 on electronic marketplace 1. In addition, provider 2 provides 101 privacy statements DA to offering 4. In this example and in the exemplary embodiments of the present invention described below, user 3 is a developer of an application that registers 110 on electronic marketplace 1 in order to obtain access to information, data, and/or services from which the developer may develop his/her application. A payment may also be processed (not illustrated here) via electronic marketplace 1. With the aid of electronic marketplace 1, user 3 finds 111 a provider 2 for the desired information, data, and/or services. User 3 subsequently accesses 120 the information, data, and/or services offered by provider 2, and based on same develops 121 the application. When the developer (user 3) subsequently passes on this application to an end user (not shown), the developer indicates privacy statements DA, stated by provider 2, as data protection characteristics of the application.

Figure 3:
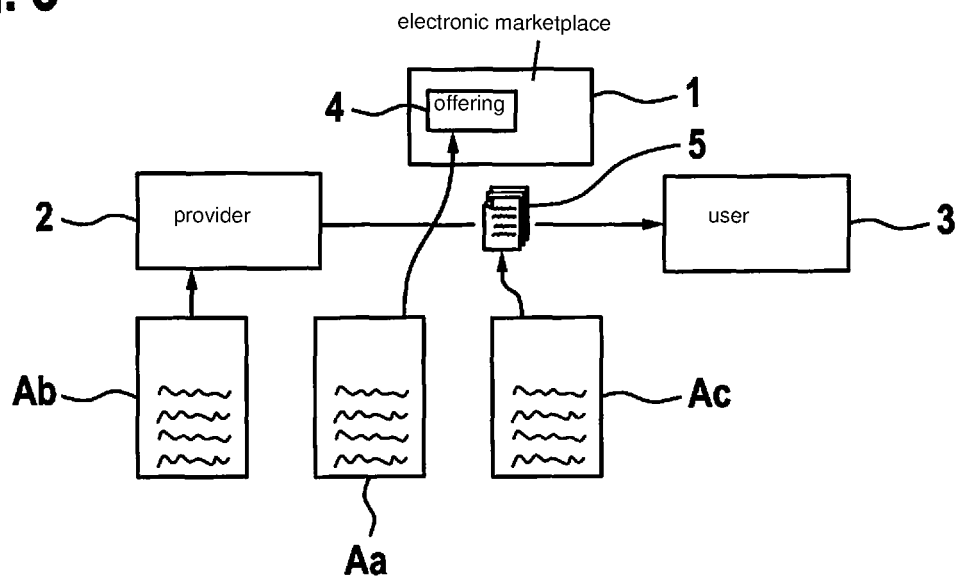
FIG. 3 shows a diagram of a system architecture of the communication network from FIG. 1, and annotations according to one specific embodiment of the present invention.

FIG. 3 shows a diagram of a system architecture of the communication network from FIG. 1, in which user 3 is accessing 120 the information, data, and/or services offered by provider 2. For the sake of simplicity, the description in this exemplary embodiment is limited to data 5. However, the procedure may generally also be carried out in the same way using information and/or services. Data 5 are transmitted by provider 2 to user 3.

FIG. 3 also illustrates three different variants of annotations Aa, Ab, and Ac, in which metainformation MI concerning offering 4 is stored. This metainformation MI also includes data protection-relevant metainformation, which provides information concerning data protection characteristics of offered data 5, such as:

which data are collected;
for what purpose the data are collected;
are more data collected than necessary;
are the data passed on; and
are the data resold.

Various types of annotations are provided: Offering annotations Aa are stored as part of offering 4 on electronic marketplace 1. Provider annotations Ab are retrievable on the service of provider 2 provided on electronic marketplace 1. Data annotations together with transmitted data 5 are transferred to user 3. Metainformation MI is easily accessible via annotations Aa, Ab, and Ac.

Electronic marketplace 1 is configured for checking the plausibility of privacy statements DA, based on a comparison of privacy statements DA for data 5 provided 101 by provider 2 to metainformation MI of associated offering 4 stored in annotations Aa, Ab, and Ac. For this purpose, electronic marketplace 1 may carry out one specific embodiment of the method according to the present invention for checking the plausibility of privacy statements DA, as shown by way of example in FIG. 3.

Figure 4:
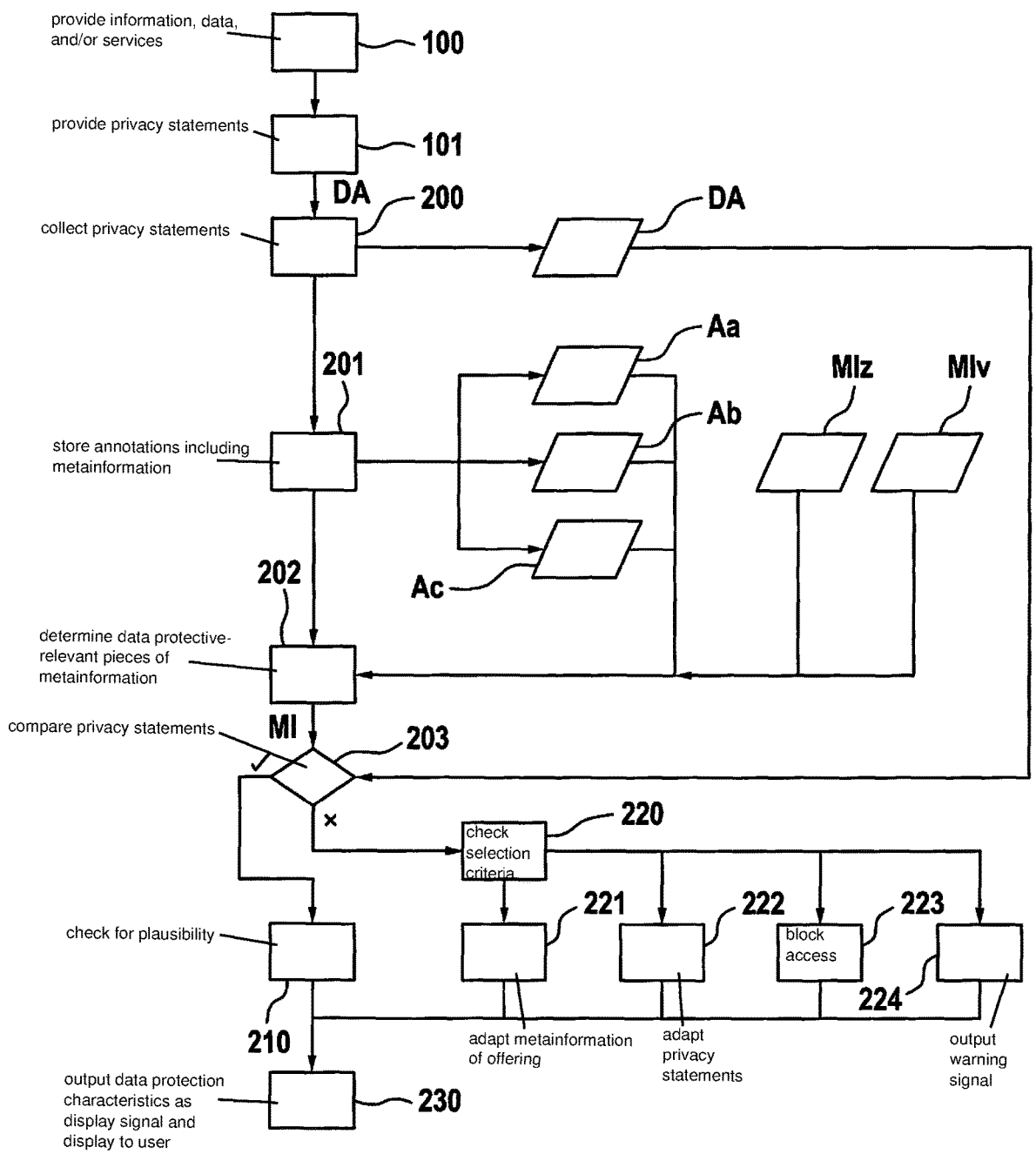
FIG. 4 shows a flow chart of one specific embodiment of the method according to the present invention.

FIG. 4 shows one specific embodiment of the method according to the present invention for checking the plausibility of privacy statements DA. At the start, as illustrated in FIG. 2, provider 2 provides 100 the information, data, and/or services as offering 4 on electronic marketplace 1. In addition, provider 2 provides 101 privacy statements DA, which are to be checked for plausibility by the method according to the present invention, for offering 4. Privacy statements DA are then collected 200 with the aid of the method according to the present invention. At least one of annotations Aa, Ab, Ac that includes metainformation MI is stored 201 in at least one variant described above in conjunction with FIG. 2.

Data protection-relevant pieces of metainformation MI are determined 202 at least from one of annotations Aa, Ab, and Ac in a further step. Furthermore, additional pieces of metainformation MIz from other providers (not illustrated), preferably from all providers, that provide the information, the data, and/or the service on electronic marketplace 1 are included in determining 202 data protection-relevant metainformation MI. In addition, further metainformation MIv from previous information, data, and/or services to which the current information, data, and/or services revert is included in determining 202 data protection-relevant metainformation MI. This sequence is continued recursively until all information, data, and/or services that have been reverted to in this sequence have been included in determining 202 data protection-relevant metainformation MI.

Privacy statements DA provided 101 by provider 2 are subsequently compared 203 to associated metainformation MI. In comparison 203, based on data protection-relevant metainformation MI it is determined in particular by electronic marketplace 1, among other things, whether data are further transmitted, whether payment is made for the further transmission, and/or whether a service collects unnecessary data; for this purpose, the information that is reasonable and necessary for the intended uses is determined with the aid of a database (not shown).

If privacy statements DA match metainformation MI, privacy statements DA are checked for plausibility 210 and consequently regarded as correct.

If privacy statements DA differ from metainformation MI, electronic marketplace 1 checks the following selection criteria 220:

Will an additional test (audit) of the information, data, and/or services with regard to further standards (not described in greater detail here) be carried out?

Are there other privacy statements that have not previously been used in this method and that may be reverted to?

Who is provider 2 of the information, data, and/or services in question, and how is it configured?

Is provider 2 certified or otherwise particularly trustworthy?

Is there an option to display a warning signal to user 3, for example via user terminal 30 and/or an interface?

Based on these selection criteria 220, one or more of the following countermeasures is/are selected:

Metainformation MI of offering 4 is adapted 221.

Privacy statements DA are adapted 222.

Access by user 3 to the information, data, and/or services that have not been checked for plausibility is blocked 223 by blocking device 13, as the result of which they are no longer available to user 3.

A warning signal is output 224 to user 3 when he/she attempts to access the information, data, and/or services not checked for plausibility.

For example, metainformation MI of offering 4 of a less trustworthy provider is adapted 221, and/or privacy statements DA thereof are adapted 222. In addition, the access to the information, data, and/or services is then suitably blocked 223 by blocking device 13 when a violation of one or more of the further standards is determined in the additional test (audit) of the information, data, and/or services. In addition, the warning signal at user terminal 30 and/or at an interface (not illustrated) is output 224 and displayed to user 3 on user terminal 30 and/or via the interface when the user attempts to access the information, data, and/or services not checked for plausibility.

Lastly, the data protection characteristics are output 230 as a display signal and displayed to user 3. Here as well, user terminal 30 and/or the interface (not illustrated) may be used for the display. The display signal may be displayed in the form of privacy icons. The privacy icons are used at least on electronic marketplace 1 for stating the data protection characteristics of the information, the data, and/or the services for user 3, but may also be provided for stating the data protection characteristics for the end user. For the display, for example different colors, such as green for good data protection, yellow/orange for (partially) problematic data protection, and red for critical data protection, and/or symbols such as an unlocked or locked padlock, or special symbols concerning the various aspects of data protection, are used.

What is claimed is:

1. A server that has a server application for access by a user to information provided a provider as an offering in the server application, the server application configured to:
    in a response to a user request by the user requesting the offering, determine whether a privacy statement of the provider is authentic by:
        obtaining data protection-relevant metainformation of the offering from metadata associated by the provider with the information of the offering; and
        comparing actual privacy protection characteristics identified by the obtained data protection-relevant metainformation to privacy protection characteristics identified in a privacy statement provided by the provider regarding the information to determine whether there is a match, the privacy statement being authenticated when the match is a result of the comparison.

2. The server as recited in claim 1, wherein the server application is an electronic marketplace.

3. The server as recited in claim 1, wherein annotations which include the metadata are obtained by the server application from the provider and are stored in the server application as part of the offering.

4. The server as recited in claim 1, wherein annotations which include the metadata are retrievable from the provider on the service provided in the server application.

5. The server as recited in claim 1, wherein annotations which include the metadata are transmittable by the provider together with the information that is transferred by the server application.

6. The server as recited in claim 1, wherein a representation of the actual privacy protection characteristics is output and displayed to the user as a display signal.

7. The server as recited in claim 1, wherein the obtaining of the data protection-relevant metainformation is additionally based on metadata of other information on which the requested information is based.

8. The server as recited in claim 1, wherein the server application is configured to respond to a result of the comparison being that the privacy is not authenticated by selecting one of a plurality of predefined responses to non-authentication.

9. The server as recited in claim 8, wherein the selecting is performed based on a certification status of the provider.

* * * * *